Aug. 24, 1926.
B. D. BANKER
1,596,864
DIRIGIBLE HEADLIGHT
Filed August 3 1925
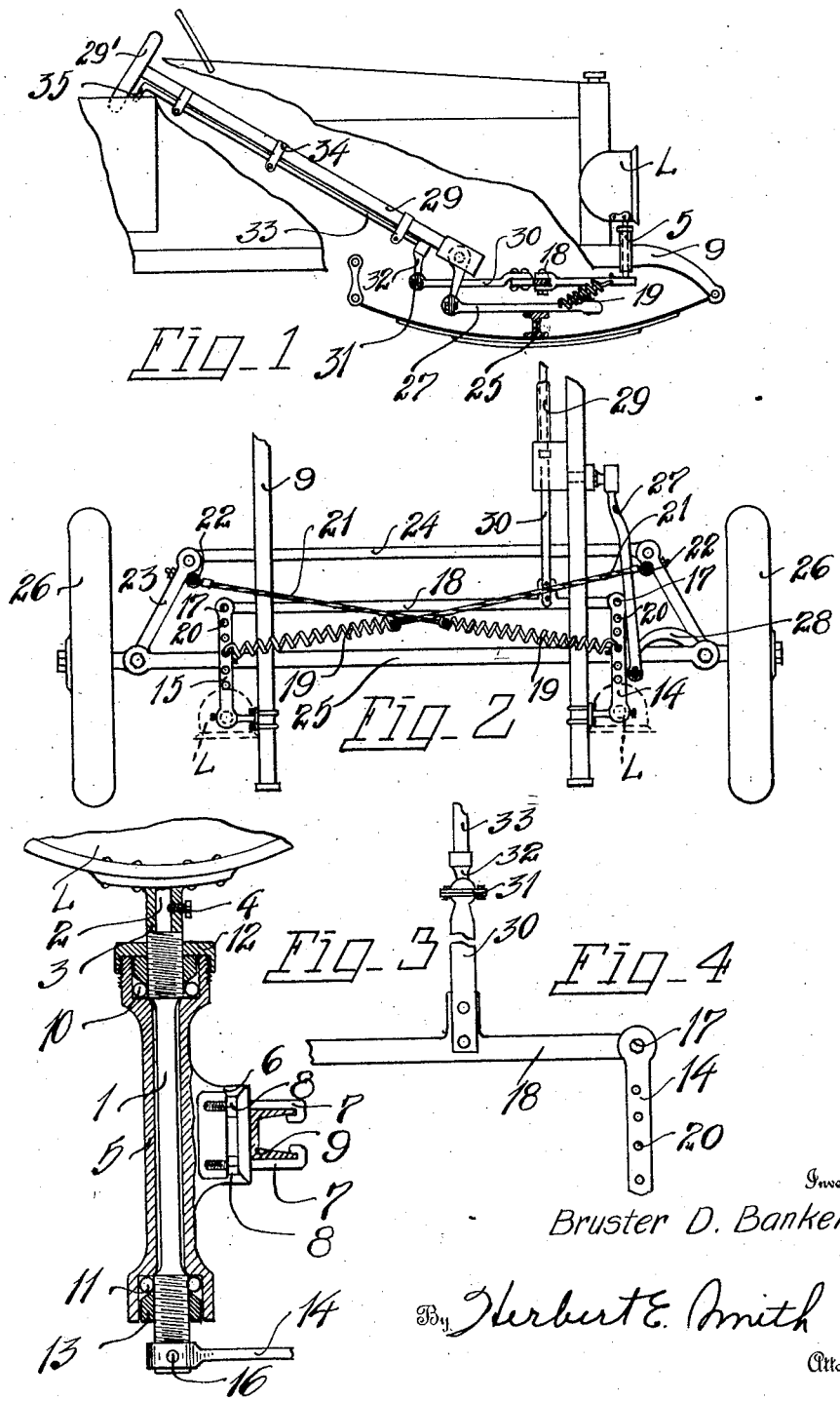
Inventor
Bruster D. Banker
By Herbert E. Smith
Attorney Patented Aug. 24, 1926.

1,596,864

UNITED STATES PATENT OFFICE.

BRUSTER D. BANKER, OF SPOKANE, WASHINGTON, ASSIGNOR OF FORTY-EIGHT ONE-HUNDREDTHS TO LENA GHYLIN, OF MOAB, WASHINGTON.

DIRIGIBLE HEADLIGHT.

Application filed August 3, 1925. Serial No. 47,722.

My present invention relates to improvements in dirigible headlights for automotive vehicles and particularly to that type of dirigible headlights that are automatically operated in combination with the steering mechanism of the automotive vehicle. In conjunction with the automatically actuating mechanism for the headlights I also employ manually operated means for actuating the headlights independently of the automatic actuating means. Thus when traveling at night with brilliant headlights that are automatically actuated with the movement of the steering wheels of the vehicle, the driver of the car may turn the headlights under manual control, to direct the rays of light from the eyes of an approaching car driver, or for the purpose of illuminating either side of the road for his own guidance. In this manner dangerous conditions may be eliminated when two cars are approaching each other, and the driver of a car may illuminate the roadside for his own purpose.

The invention consists in certain novel combinations and arrangements of parts as will hereinafter be set forth and claimed. In the accompanying drawings I have illustrated one complete example of the physical embodiment of my invention wherein the parts are combined and arranged in accordance with the best mode I have thus far devised for the practical application of the principles of my invention.

Figure 1 is a view in side elevation of so much of an automobile as is necessary to illustrate the application thereto of the device of my invention.

Figure 2 is a top plan view of the mechanism.

Figure 3 is a sectional view of one of the lamp posts and its connections.

Figure 4 is a detail view showing a portion of the manually operated mechanism for the dirigible lamps or headlights.

The headlights L may be of usual or suitable type and are supported at the opposite sides of the front of the car in desired location. Each lamp is supported from a rotatable spindle 1 and the upper end of the spindle is fashioned with a stud-pin 2 over which the boss or sleeve 3 of the lamp is fitted, and a set bolt or screw 4 is utilized to rigidly secure the lamp or headlight L to the stud-pin in order that the headlight may turn with the spindle 1.

The supporting post for the lamp spindle in the form of a tubular casting 5 is rigidly maintained in upright position, preferably at one side of the radiator, by means of an attaching flange 6 which is secured by bolt-hooks 7 and nuts 8 to a side frame bar 9. By this means the two lamp posts may with facility be attached to the respective side bars of the frame 9 of the automobile in the desired position.

To facilitate the movement of the spindles in their bearing posts, an upper ball bearing 10 and a lower ball bearing 11 are used, and a cap nut 12 is used at the upper end of the bearing post to close the upper bearing. Suitable bearing cones 13 are threaded on the opposite ends of the spindle for co-action with the ball bearings.

The spindles as thus supported in vertical position are adapted to oscillate or turn in their bearing posts under normal conditions and the headlights L are turned automatically with the steering movement of the car for illuminating the road in advance of the car.

For automatically actuating the headlights, each spindle, at its lower end is provided with a rigid crank arm as 14 and 15, which arms are pinned to the spindle as at 16. These arms extend horizontally toward the rear of the car and each is pivoted at 17 to the ends of a transversely extending connecting bar 18 in order that the spindles 1 may turn in unison when power is applied to these arms 14 and 15.

The headlights are operated through resilient connections from the steering apparatus, and for this purpose a pair of oppositely extending springs 19 are used, each having its outer end anchored in a selected hole 20 of an arm 14 and 15, and by means of extension cables 21 secured at the inner ends of the springs, the resilient connection is made at 22 to the opposite steering crank arms 23 of the steering mechanism. These crank arms, as usual are connected by a steering bar 24 and supported from the front axle 25 for the purpose of turning the front steering wheels 26 of the automobile, and connections 27 and 28 at one side of the vehicle complete the steering connections to the steering post 29 which latter is manipulated from the wheel 29' in usual manner. Thus as the wheel 29' is turned for steering the car the headlights L are automatically operated through the resilient connections.

These resilient connections permit the use of the manually operated control mechanism for the headlights independent of the steering mechanism. For this purpose a rearwardly extending arm 30 is rigidly fixed as by bolts to the connecting bar 18 of the headlight mechanism, and a universal or knuckle joint 31 is used as a connection between this arm and a crank arm 32 which is rigid with the operating rod 33. The operating rod is supported to turn in bearing brackets 34 secured to the steering post, and a crank handle 35 at the end of this rod is located conveniently near the steering wheel 29' where it is accessible for the driver of the car.

Thus it will be apparent that by turning the crank handle 35 to rock the rod 33 in its bearing brackets, the connecting bar 18, through its arm 30 and the flexible connections to the rod 33, may be swung transversely of the car, and thus swing the spindles 1 in their bearing posts to turn the headlights for the purpose described.

By selecting one of the various holes 20 in the arms 14 and 15 the tension of the springs 19 may be varied to secure the proper adjustment for insuring the automatic operation of the headlights and to permit manual operation thereof, and it will be apparent that either means may be employed in a co-operative manner for attaining the desired result.

By properly tensioning the springs the headlights are also held against unnecessary motion and are maintained in proper positions at all times.

Having thus fully described my invention, what I claim as new and desire to secure by Letters Patent is—

The combination with a pair of tubular posts, spindles supported therein, a rigid arm on each spindle, and a bar pivotally connecting said rigid arms, a pair of crank arms forming part of the steering mechanism, crossed resilient connections comprising cables and springs suspended between said spindle arms and crank arms, a manually controlled rock rod, and flexible connections between said rock rod and pivoted connecting bar.

In testimony whereof I affix my signature.

BRUSTER D. BANKER.